United States Patent
Li et al.

(10) Patent No.: US 12,164,424 B2
(45) Date of Patent: Dec. 10, 2024

(54) DOUBLE RING CACHE ARCHITECTURE

(71) Applicant: ARKOSE LABS HOLDINGS, INC., San Mateo, CA (US)

(72) Inventors: Du Li, San Francisco, CA (US); Arnab Mukherji, Orlando, FL (US)

(73) Assignee: ARKOSE LABS HOLDINGS, INC., San Mateo, CA (US)

( * ) Notice: Subject to any disclaimer, the term of this patent is extended or adjusted under 35 U.S.C. 154(b) by 0 days.

(21) Appl. No.: 18/224,470

(22) Filed: Jul. 20, 2023

(65) Prior Publication Data
US 2024/0028511 A1 Jan. 25, 2024

Related U.S. Application Data

(60) Provisional application No. 63/391,097, filed on Jul. 21, 2022.

(51) Int. Cl.
| | | |
|---|---|---|
| *G06F 12/08* | (2016.01) | |
| *G06F 12/0811* | (2016.01) | |
| *G06F 12/0831* | (2016.01) | |
| *G06F 12/14* | (2006.01) | |

(52) U.S. Cl.
CPC ...... *G06F 12/0811* (2013.01); *G06F 12/0833* (2013.01); *G06F 12/1408* (2013.01)

(58) Field of Classification Search
CPC ............. G06F 12/0811; G06F 12/0833; G06F 12/0873; G06F 12/0897; G06F 2212/1024; G06F 2212/1052; G06F 2212/154; G06F 2212/284; G06F 2212/314; G06F 2212/465; G06F 16/24552

See application file for complete search history.

(56) References Cited

U.S. PATENT DOCUMENTS

| | | | |
|---|---|---|---|
| 2005/0125592 A1* | 6/2005 | Sawdey | G06F 12/0897 711/3 |
| 2018/0150397 A1* | 5/2018 | Gupta | G06F 12/0813 |
| 2022/0019530 A1* | 1/2022 | Roberts | G06F 12/0862 |

* cited by examiner

*Primary Examiner* — Khoa D Doan
*Assistant Examiner* — Julian S Mendel
(74) *Attorney, Agent, or Firm* — Womble Bond Dickinson (US) LLP

(57) ABSTRACT

A distributed cache apparatus includes storage comprising a range of stored data and a processing device. A first cache level of the storage is segmented into a plurality of first data sub-ranges of the range of stored data, and each of the first data sub-ranges is associated with one of a first subset of a plurality of node devices. A second cache level of the storage is segmented into a plurality of second data sub-ranges of the range of stored data, and each of the second data sub-ranges is associated with one of a second subset of the node devices. Each of the second data sub-ranges is smaller than each of the first data sub-ranges. The processing device is configured to process a read request for data within the range of stored data by accessing one of the second subset of the node devices.

20 Claims, 9 Drawing Sheets

DOUBLE RING CACHE ARCHITECTURE

CROSS-REFERENCE TO RELATED APPLICATIONS

This application claims the benefit of U.S. Provisional Application No. 63/391,097, filed on Jul. 21, 2022, the entire content of which is hereby incorporated by reference herein.

TECHNICAL FIELD

Aspects of the present disclosure relate to distributed cache architectures, and more particularly, to distributed cache architectures emphasizing low latency for security applications.

BACKGROUND

Computer resources are often created for access by others and creators may seek to control access to those computer resources. For example, there may be a first set of users who are authorized and intended to access those computer resources and a second set of users who may try to access those computer resources but who are unauthorized by the creators and/or operators of those computer resources. The second set of users may incorporate user devices to access those computer resources and circumvent controls on those computer resources. It is often desirable to reduce impediments to access to the computer resources by user devices that are determined to be operated by the first set of users (e.g., authorized). In some situations, the first set of users are human users in the target audience and the second set of users may be unauthorized human users, or automated systems that may overuse the computer resources.

Authentication programs are commonly used to ensure that information entered to access the computer resources is entered by a human user of a computing device rather than by an automated program commonly known as a 'bot' or an 'agent.' The authentication programs may perform comparisons of data related to visitors of the computer resource to data associated with known authorized users and/or known unauthorized users to make a decision on whether a potential visitor to a computer resource is authorized. It may be beneficial for these comparisons to be performed quickly, as the authorization step may be seen as an impediment to the access of the computer resource by authorized users if the authorization process is performed slowly. In some cases, cache systems may be used to improve performance of the authorization process.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

As previously noted, authorization architectures for computing resources may make use of cache systems to improve a latency associated with an authorization process. A cache system may serve as an intermediate, high performing (e.g., speed) storage between a data query and the main storage of the data. The cache system may store frequently and/or recently-used data and respond to the data query without requiring the data query to be handled by the main storage of the data, which may be slower-performing. In some cases, the cache system may be a distributed cache system. A distributed cache may span multiple servers (also referred to herein as node devices) so that it can grow in size and in transactional capacity. Each of the node devices may be associated with and/or store part of the cache, and a cache client may direct data queries to an associated node device to retrieve data from the query.

Figure 1:
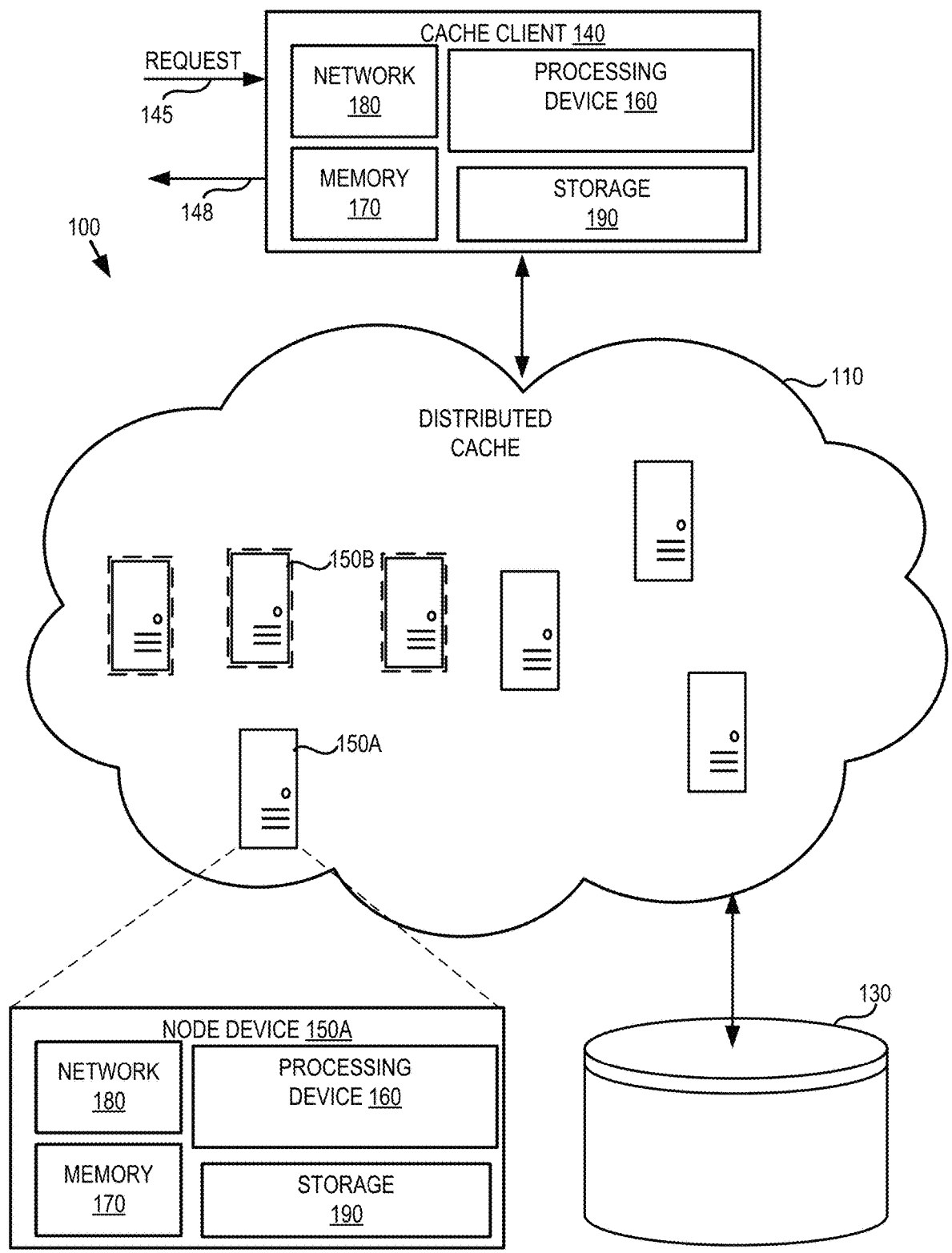
FIG. 1 depicts a high-level component diagram of an illustrative example of a distributed cache architecture, in accordance with one or more aspects of the present disclosure.

FIG. 1 depicts a high-level component diagram of an illustrative example of a distributed cache architecture 100, in accordance with one or more aspects of the present disclosure. The infrastructure illustrated in FIG. 1 is intended to be schematic in nature, and is not intended to limit the embodiments of the present disclosure.

As shown in FIG. 1, distributed cache architecture 100 includes a plurality of computing devices, including cache client device 140 and a plurality of node devices 150. For convenience of description, only seven node devices 150, including first node device 150A and second node device 150B, and a single cache client device 140 are illustrated, but it will be understood that additional node devices 150 and/or cache client devices 140 may be present without deviating from the scope of the present disclosure.

FIG. 1 and the other figures may use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral.

The cache client device 140 and node devices 150 include one or more processing devices 160, memory 170, one or more network interfaces 180, and storage 190. It should be noted that although, for simplicity, a single processing device 160 is depicted in each of the cache client device 140 and node devices 150 depicted in FIG. 1, other embodiments of the cache client device 140 and node devices 150 may include multiple processing devices 160, storage devices 190, or other devices. For clarity, some components of the cache client device 140 and node devices 150 are not shown.

Memory 170 may include volatile memory devices (e.g., random access memory (RAM)), non-volatile memory devices (e.g., flash memory) and/or other types of memory devices, and one or more network interfaces 180. In certain implementations, memory 170 may be non-uniform access (NUMA), such that memory access time depends on the memory location relative to processing device 160.

Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like. Different ones of the cache client device 140 and node devices 150 may have different types of processing device 160.

The cache client device 140 and node devices 150 may be a server, a mainframe, a workstation, a personal computer (PC), a mobile phone, a palm-sized computing device, a virtual instance of a computing device, etc. For example, in FIG. 1, dashed lines are illustrated around node devices 150 which are implemented as virtual machines. For example, a first node device 150A is illustrated as a non-virtualized server while a second node device 150B is illustrated as a virtual machine. For purposes of explanation within the present disclosure, virtualized and non-virtualized machined are treated similarly and, as such, a specific description of the operation thereof is omitted for brevity.

In some embodiments, the cache client device 140 and the node devices 150 may be directly or indirectly communicatively coupled through one or more of the network interfaces 180. For example, the cache client device 140 and one or more of the node devices 150 may be coupled to each other (e.g., may be operatively coupled, communicatively coupled, may communicate data/messages with each other) via network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI® hotspot connected with the network 110 and/or a wireless carrier system that can be implemented using various data processing equipment, communication towers (e.g., cell towers), etc. The network 110 may carry communications (e.g., data, message, packets, frames, etc.) between the various components of the cache client device 140 and one more of the node devices 150. Communication between the cache client device 140 and the node devices 150 may support transmission control protocol/internet protocol (TCP/IP), hypertext transfer protocol (HTTP), hypertext transfer protocol secure (HTTPS), remote procedure calls (RPC), and the like.

The cache architecture 100 may further include storage 130. Storage 130 may also be coupled to network 110 such that the network 110 may carry communications (e.g., data, message, packets, frames, etc.) between the cache client device 140, one more of the node devices 150, and the storage 130. Storage 130 may be configured to store data of the cache architecture 100. As will be discussed further herein, the node devices 150 may cache data that is stored in storage 130. Storage 130 may provide a data storage volume based on one or more available technologies. For example, storage 130 may be configured using a Redundant Array of Inexpensive (or Independent) Disks (RAID) or may be configured as Just a Bunch of Disks (JBOD). Storage 130 may include one or more network interfaces (not shown) to couple the storage to the network 110. The storage 130 may provide networked access to the storage 130 via one or more network storage protocols. For example, storage 130 may support transmission control protocol/internet protocol (TCP/IP), HTTP, HTTPS, RPC, file transfer protocol (FTP), internet message access protocol (IMAP), Fibre Channel Protocol (FCP), Fibre Channel over Ethernet (FCoE), small computer systems interface (SCSI), Internet SCSI (iSCSI), server message block/common internet file system (SMB/CIFS), network file system (NFS), ATA over Ethernet (AoE), HyperSCSI, Infiniband, Remote DMA (e.g., Remote DMA over Converged Ethernet (RoCE), and the like.

In some embodiments, one or more of the node devices 150 may be configured to perform a caching operation of the storage 130 utilizing network 110. For example, each of the node devices 150 may be configured to store a portion of the data of storage 130. For example, the node devices 150 may retrieve the portion of the data of storage 130 from storage 130 (e.g., via a request over network 110) and store the portion of the data locally (e.g., in storage 190 of the node device 150). The node device 150 may be configured to keep their portion of the data synchronized with the storage 130, including writing back (either directly or indirectly, as will be discussed further herein) any changes (e.g., asynchronously) to the portion of the data to the storage 130.

A request 145 for data stored on the storage 130 may be received at cache client device 140. The cache client device 140 may analyze the request 144 to determine which data is being requested. The cache client device 140 may maintain a mapping (or execute an algorithm to generating a mapping, such as a hash function) between the data and one or more of the node devices 150. The cache client device 140 may determine one of the node devices 150 that is associated (e.g., mapped to) the data being requested by request 145, and direct the request 145 to the node device 150. The node device 150 may return the data requested by the request 145 to cache client device 140, which may provide the requested data as part of a response 148. In some embodiments, the cache client device 140 may maintain a mapping between the node devices and the data being requested, but the embodiments of the present disclosure are not limited to such a configuration. In some embodiments, a proxy may be present between the cache client device 140 and the node devices 150. The proxy may maintain the mapping and may forward requests/responses between the cache client device 140 and the node devices 150. In some embodiments, the node devices 150 are peers that maintain the mapping and forward client requests to the right node devices 150.

Conventional distributed cache systems can suffer from issues associated with fault tolerance. For example, node devices 150 in distributed cache systems are often implemented by or on inexpensive and/or less complex machines, as such machines may be easier and/or cheaper to deploy. However, such machines may have a higher risk for failure, which may cause a node device 150 to go offline.

When a node device 150 fails and a replacement is added, the replacement node device 150 may initially not have its portion of data from the storage 130 loaded. Initial reads to the replacement node device 150 may result in the data not being present (e.g., a cache miss), and queries may be sent to the storage 130 in the background to load the missing data. This operation may result in a burst of reads that hit the underlying storage 130 because they are not present in the new cache node device 150. The number of writes to the storage 130 may be similar to the old node device 150 because each incoming write request may lead to one asynchronous write to the storage 130.

The present disclosure addresses the above-noted and other deficiencies by incorporating a multi-layer cache configuration within the cache architecture 100. The node device 150 may be organized in a plurality of cache rings, also referred to as cache levels, with inner rings serving as a secondary cache for the outer rings. In some embodiments, rather than performing a one-to-one mapping between the node devices 150 of the inner and outer rings, an asymmetric number (e.g., fewer) of node devices 150 may be provided for the secondary inner ring. Some node devices 150 of the inner ring may cache data over a range that spans more than one of the node devices 150 of the outer ring, which may reduce a number of node devices 150 that are utilized by the cache architecture 100.

Moreover, the cache architecture 100 may take advantage of particular behavioral characteristics of authorization systems, in which a cache miss may be returned to the user as a data fault/error rather than performing a read to the storage 130 to retrieve the data. The data fault/error may result in a particular authorization operation being performed again, but may not result in a failure of the authorization system. In some embodiments, the data fault/error may be preferable than the latency associated with a read to the storage 130 to retrieve the specific data.

Figure 2:
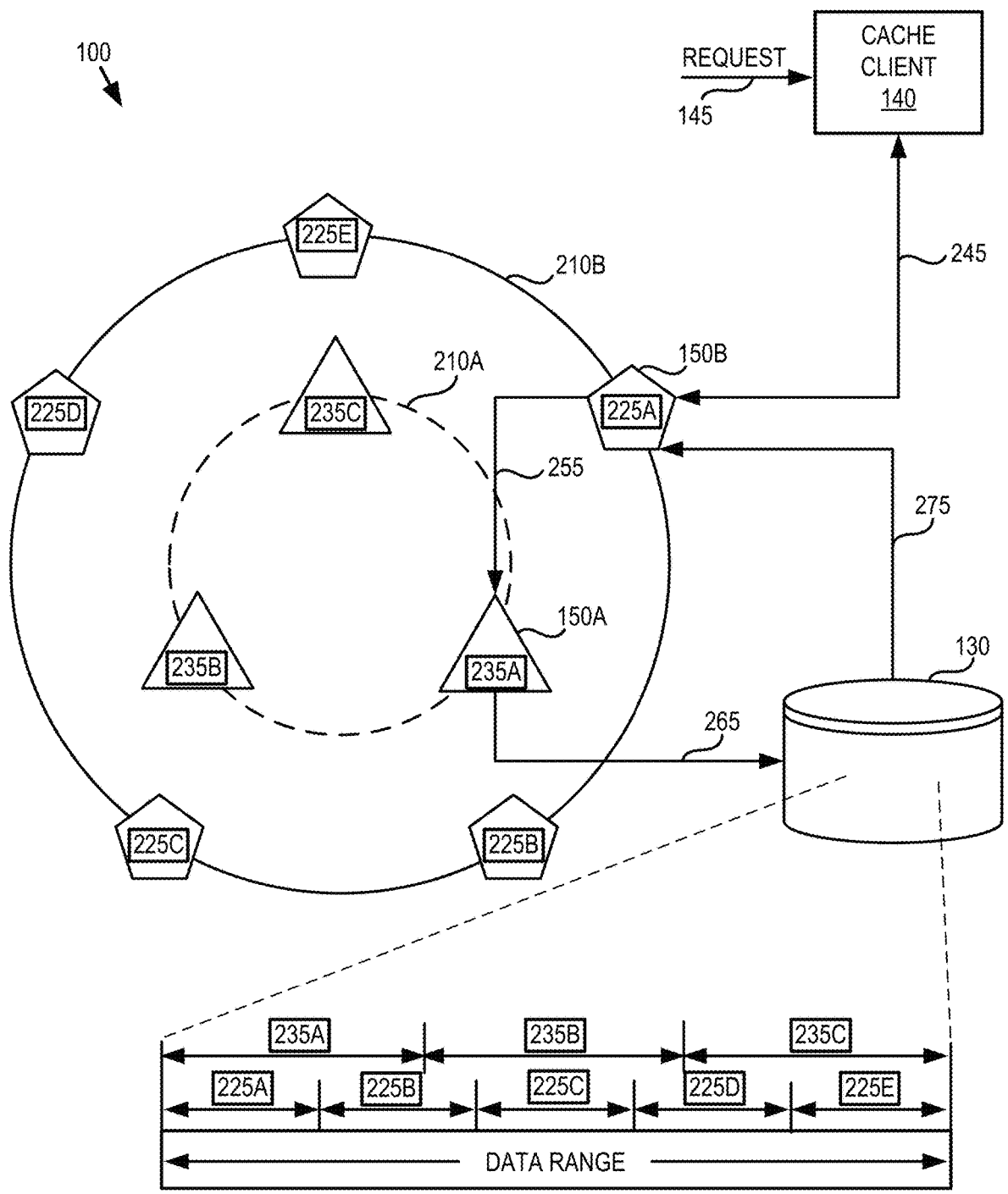
FIG. 2 is a schematic diagram illustrating a configuration of rings of a cache architecture, in accordance with one or more aspects of the present disclosure.

FIG. 2 is a schematic diagram illustrating a configuration of rings 210 of a cache architecture 100, in accordance with one or more aspects of the present disclosure. Though only two cache rings 210 are illustrated in FIG. 2, the embodiments of the present disclosure are not limited to two rings 210 and, in some embodiments, more rings 210 may be present. Elements of FIG. 2 that have been previously described will be omitted for brevity.

Referring to FIGS. 1 and 2, the cache architecture 100 may include an inner ring 210A (e.g., a first cache level) and an outer ring 210B (e.g., a second cache level). Each of the inner and outer rings 210A, 210B may include a plurality of node devices 150. Each of the node devices 150 of both the inner and outer rings 210A, 210B may be configured to store data sub-ranges of the data stored in storage 130.

For example, outer ring 210B may include N node devices 150, where N is an integer greater than 1. The range of data stored in storage 130 may be categorized into a plurality of sub-ranges 225, and each of the sub-ranges 225 may be respectively associated with one of the N node devices 150 of the outer ring 210B. For example, if the range of data of the storage 130 is S bytes (where S is a positive integer greater than 0), then a plurality of non-overlapping sub-ranges 225 (e.g., a first set of sub-ranges 225) of the S byes may be assigned and/or associated with one of the node devices 150 of the outer ring 210B. In some embodiments, the sub-ranges 225 may be of equal size. In such embodiments, for example, each of the node devices 150 of the outer ring 210B may be assigned and/or associated with S/N bytes of the data of the storage 130.

The inner ring 210A may include M node devices 150, where M is an integer less than or equal to N. As with the outer ring 210B, the range of data stored in storage 130 may be categorized into a plurality of non-overlapping sub-ranges 235 (e.g., a second set of sub-ranges 235), and each of the sub-ranges 235 may be respectively associated with one of the M node devices 150 of the inner ring 210A. For example, if the range of data of the storage 130 is S bytes (where S is a positive integer greater than 0), then a plurality of sub-ranges 235 of the S byes may be assigned and/or associated with one of the node devices 150 of the inner ring 210A. In some embodiments, the sub-ranges 235 may be of equal size. In such embodiments, for example, each of the node devices 150 of the inner ring 210A may be assigned and/or associated with S/M bytes of the data of the storage 130.

Due to the nature of the inner ring 210A and the outer ring 210B, each of the data values (e.g., the addresses and/or keys) of the storage 130 may be mapped to two sub-ranges: a first sub-range 235 of data assigned to a node device 150 of the inner ring 210A and a second sub-range 225 of data assigned to a node device 150 of the outer ring 210B.

FIG. 2 provides an example of the multi-ring cache architecture 100 where the inner ring 210A contains three node devices 150 (e.g., M=3) and the outer ring 210B contains five node devices 150 (e.g., N=5). The number of node devices 150 in each of the inner and outer rings 210A, 210B of FIG. 2 is merely an example for illustration, and is not intended to limit the embodiments of the present disclosure.

As illustrated in FIG. 2, a data range of the storage 130 may be allocated into a plurality of first sub-ranges 235 that are each assigned and/or associated with a node device 150 of the inner ring 210A and into a plurality of second sub-ranges 225 that are each assigned and/or associated with a node device 150 of the outer ring 210B. For example, the data range of the storage 130 may be allocated into five sub-ranges 225A-225E, and each of the five sub-ranges 225A-225E may be assigned and/or associated with a respective one of the five node devices 150 of the outer ring 210B. Additionally, the data range of the storage 130 may also be allocated into three sub-ranges 235A-235C, and each of the three sub-ranges 235A-235C may be assigned and/or associated with a respective one of the three node devices 150 of the inner ring 210A.

In some embodiments, the node devices 150 of the outer ring 210B and the node devices 150 of the inner ring 210A may be configured to initially load the data of the storage 130 asynchronously (e.g., at startup of the cache architecture 100). For example, the node device 150B of the outer ring 210B that is associated with the data sub-range 225A may be configured to load the associated data of sub-range 225A from storage 130 asynchronously in an initial (e.g., a start-up) operation. The data of the sub-range 225A may be loaded and/or initialized, for example, into storage 190 (see FIG. 1). The other node devices 150 of the outer ring 210B that are associated with data sub-ranges 225B-225E may be similarly asynchronously loaded and/or initialized.

Additionally, the node device 150A of the inner ring 210A that is associated with the data sub-range 235A may be configured to load the associated data of sub-range 235A from storage 130 asynchronously in an initial (e.g., a start-up) operation. The other node devices 150 of the inner ring 210A that are associated with data sub-ranges 235B-235C may be similarly asynchronously loaded and/or initialized.

In operation, the node devices 150 of the outer ring 210B are configured to handle data read and write operations from incoming requests 145. For example, the cache client device 140 may receive a request 145 including a data read or write request. The cache client device 140 may analyze the request 145 to determine with which data sub-range 225 of the outer ring 210B the request 145 is associated. In some embodiments, determining the appropriate data sub-range 225 of the request 145 may involve analyzing an address and/or key of data associated with the request 145. In some embodiments, determining the appropriate data sub-range 225 of the request 145 may involve referencing a mapping table that maps an address of data associated with the request 145 to one of the sub-ranges 225 of the outer ring 210B. In some embodiments, determining the appropriate data sub-range 225 of the request 145 may involve performing a hashing operation on an address of data associated with the request 145, which may indicate one of the sub-ranges 225 of the outer ring 210B.

In some embodiments, the request 145 may include a key. For example, the storage 130 may store data as key-value pairs, and the request 145 may request to read or write a value associated with a given key. The cache client device 140 may be configured to map a key to a particular data sub-range 225 of the outer ring 210B. In some embodiments, determining the appropriate data sub-range 225 of the request 145 may referencing a mapping table that maps the key of the request 145 to one of the sub-ranges 225 of the outer ring 210B. In some embodiments, determining the appropriate data sub-range 225 of the request 145 may involve performing a hashing operation on the key, which may indicate one of the sub-ranges 225 of the outer ring 210B. Appropriate hashing algorithms may be configured to distribute key values across the data range of the storage 130.

Once the appropriate sub-range 225 is determined, the request may be sent by a command transmission 245 to the node device 150 (e.g., node device 150B) that is assigned to and/or associated with the appropriate sub-range 225. The node device 150B, upon receipt of the command transmission 245, may determine if the requested operation is a read or a write operation.

If the operation is a read operation, the node device 150B may determine if the address associated with the read operation is currently populated/present in the data the node device 150B has loaded for the data sub-range 225. If the data is present for the provided address and/or key, it will be returned to the cache client device 140. If it is not present, a data not found error may be returned to the cache client device 140. In such a situation, the data that was not found may be asynchronously loaded after the response is provided to the cache client device 140. In some embodiments, the data may be asynchronously loaded from the storage 130 and/or the inner ring 210A. Additional details with respect to the read operation will be provided with respect to FIG. 3A.

If the operation is a write operation, the updated data of the data sub-range 225 stored with the node device 150B may be updated. In addition, a write request 255 may be provided from the node device 150B of the outer ring 210B to one of the node devices 150 (e.g., node device 150A) of the inner ring 210A. For example, the node device 150B of the outer ring 210B may analyze the address and/or key of the updated data to determine with which data sub-range 235 of the inner ring 210A the request 145 is associated. In some embodiments, determining the appropriate data sub-range 235 may involve referencing a mapping table that maps the address and/or key of the data of the request 145 to one of the sub-ranges 235 of the inner ring 210A. In some embodiments, determining the appropriate data sub-range 235 may involve performing a hashing operation on the address and/or key of the data of the request 145, which may indicate one of the sub-ranges 235 of the inner ring 210A. More details with respect to the write operation will be provided with respect to FIG. 3B.

The write request 255 from the node device 150B of the outer ring 210B to one of the node devices 150A of the inner ring 210A may indicate that the one of the node devices 150A of the inner ring 210A is to update the associated value within its data sub-range 235. This may allow the node device 150A of the inner ring 210 to keep its data current with changing values of the data caused by write requests received by the cache client device 140 and processed by the outer ring 210B.

Upon receipt of the write request at the inner ring 210A, the associated node device 150A of the inner ring 210A may also provide an asynchronous write request 265 to the storage 130 to update the data value on the storage 130 as well. In some embodiments, the command transmission 245, the write request 255, and/or the asynchronous write request 265 may use a variety of network protocols, such as HTTP, HTTPS, and/or RPC, though the embodiments of the present disclosure are not limited thereto.

Figure 3A:
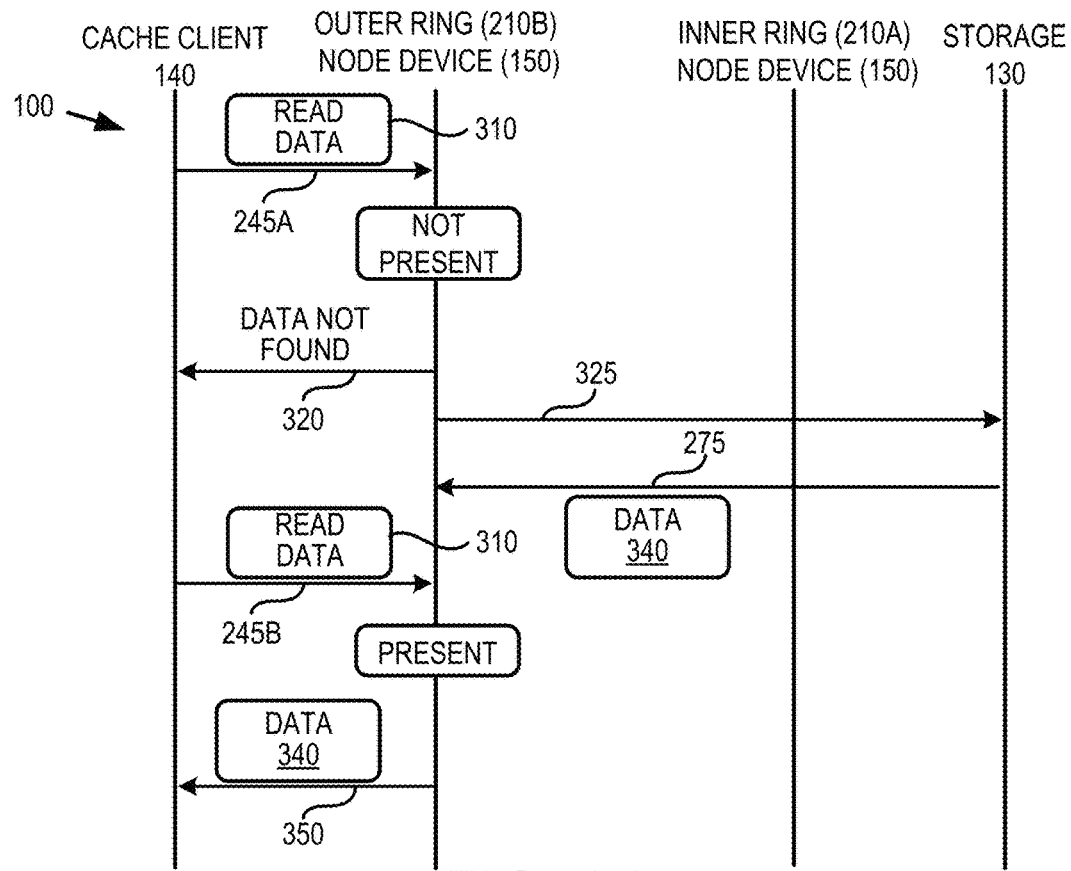
FIGS. 3A and 3B provide additional details regarding read and write operations of the cache architecture according to some embodiments of the present disclosure.
Figure 3B:
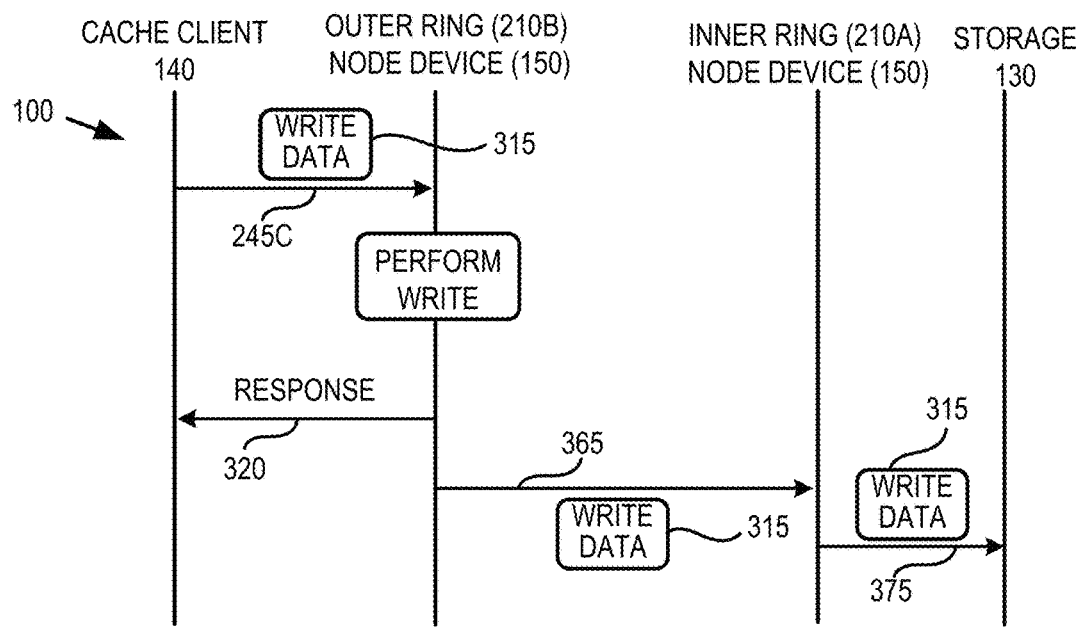

FIGS. 3A and 3B provide additional details regarding read and write operations of the cache architecture 100 according to some embodiments of the present disclosure. The cache architecture 100 of FIGS. 3A and 3B is illustrated with two cache rings/levels (e.g., a double-ring cache) but the embodiments of the present disclosure are not limited to two cache levels, and the cache architecture 100 may contain more than two cache rings. A description of elements of FIGS. 3A and 3B that have been previously described will be omitted for brevity.

Referring to FIG. 3A, a read operation may begin when the cache client device 140 sends a command transmission 245A to a node device 150 of the outer ring 210B. The command transmission 245A may contain an address and/or key associated with read data 310. As previously described, the cache client device 140 may determine the appropriate node device 150 to which the command is to be transmitted based on a sub-range of the storage data associated with the address and/or key of the read data 310. For example, the cache client device 140 may perform a hashing operation on the address and/or key of the read data 310 to determine to which node device 150 the sub-range associated with the read data 310 is assigned.

The node device 150 may analyze the address of the address and/or key of the read data 310 and determine that a data value associated with the read data 310 is not present in the storage of the node device 150. For example, the node device 150 may determine that the read data 310 has not been cached on the node device 150 (e.g., a cache miss).

In response to determining that the read data 310 has not been cached, the node device 150 may return 320 a data not found/not present error to the cache client device 140. The cache client device 140 may return the error in response to a received read request.

In response to determining that the data is not present, the node device 150 of the outer ring 210B may also transmit a read command 325 to storage 130. The read command may include the address of the read data 310 that was determined to be absent from the node device 150.

The storage 130 may respond to the read command 325 with a response 275. The response 275 may include the data 340 that is associated with the address of the read data 310 that was determined to be absent from the node device 150. The node device 150 may store the data 340 within its local storage.

Subsequently, the cache client device 140 may send a command transmission 245B to the node device 150 of the outer ring 210B. The command transmission 245B may be sent in response to a subsequent request (e.g., request 145 of FIG. 2) for data received by the cache client device 140. The command transmission 245B may contain the same read data 310 (e.g., having a same key and/or address) that was previously not found within the cache architecture 100. As previously described, the cache client device 140 may determine the appropriate node device 150 of the outer ring 210B to which the command is to be transmitted based on a sub-range of the storage data associated with the address and/or key of the read data 310.

The node device 150 of the outer ring 210B may analyze the address and/or key of the read data 310 and determine that a data value associated with the read data 310 is present in the storage of the node device 150. For example, the node device 150 may determine that the read data 310 has been cached (e.g., with data value 340) on the node device 150 (e.g., a cache hit) based on the response from the storage 130 to the read command 325.

In response to determining that the read data 310 is present in the cache of the node device 150, the node device 150 may return 350 the data 340 associated with the address and/or key of the read data 310 to the cache client device 140. The cache client device 140 may return the read data 340 in response to a received read request.

Though FIG. 3A illustrates that the node device 150 of the outer ring 210B retrieves data associated with a cache miss from the storage 130, the embodiments of the present disclosure are not limited thereto. In some embodiments, the node device 150 of the outer ring 210B may instead load the data 340 from a node device 150 of the inner ring 210A. The node device 150 of the outer ring 210B may determine the appropriate node device 150 of the inner ring 210A from which the data is to be load based on a sub-range of the storage data associated with the address and/or key of the read data 310. For example, the node device 150 of the outer ring 210B may perform a hashing operation on the address and/or key of the read data 310 (or request that the cache client device 140 perform such a hash) to identify the appropriate data sub-range of the inner ring 210A and the node device 150 of the inner ring 210A to which the appropriate data sub-range is assigned.

The read operation of the multi-ring cache architecture 100 may provide multiple benefits. For example, the read operation illustrated, for example, in FIG. 3A may allow the multi-ring cache architecture 100 to emphasize a reduced latency over accuracy. For example, some conventional cache architectures, when experiencing a cache miss, delay the response to read the data from the backing storage. In contrast, the embodiments of the present disclosure allow for the option of a "data not present" return value. This allows for a quicker return response to an incoming command. This behavior may provide a specialized benefit in authorization systems. For example, the multi-ring cache architecture 100 may be utilized to provide access to counters, client information, or other data that may be associated with an authorization process. Unlike some conventional caching system, a data read of a counter for an authorization process may not be majorly affected if the read request provides a not present error. In such a circumstance, the authorization process may be repeated, or a "quick path" through the authorization process may be denied.

Referring to FIG. 3B, a write operation of the multi-ring cache architecture 100 may begin when the cache client device 140 sends a command transmission 245C to a node device 150 of the outer ring 210B. The command transmission 245C may contain write data 315, which may include an address and/or key as well as a value to be written that is associated with the address and/or key. As previously described, the cache client device 140 may determine the appropriate node device 150 to which the command is to be transmitted based on a sub-range of the storage data associated with the address and/or key of the write data 315. For example, the cache client device 140 may perform a hashing operation on the address and/or key of the write data 315 to determine to which node device 150 of the outer ring 210B the sub-range associated with the write data 315 is assigned.

The node device 150 of the outer ring 210B may analyze the address and/or key of the write data 315 and may update the data associated with the address and/or key of the write data 315 within the storage of the node device 150 with the value of the write data 315.

In response to updating the write data 315, the node device 150 may return 320 a success response to the cache client device 140. The cache client device 140 may return the success in response to a received write request.

Subsequently, the node device 150 of the outer ring 210B may send a message 365 to a node device 150 of the inner ring 210A associated with the address and/or key of the write data 310. The message 365 may contain the same write data 315 that was provided by the cache client device 140. The node device 150 of the outer ring 210B may determine the appropriate node device 150 of the inner ring 210A to which the write data 315 is to be provided based on a sub-range of the storage data associated with the address and/or key of the write data 315. For example, the node device 150 of the outer ring 210B may perform a hashing operation on the address and/or key of the write data 315 (or request that the cache client device 140 perform such a hash) to identify the appropriate data sub-range of the inner ring 210A and the node device 150 of the inner ring 210A to which the appropriate data sub-range is assigned.

The node device 150 of the inner ring 210A may analyze the address and/or key of the write data 315 and may update the data associated with the address and/or key of the write data 315 within the storage of the node device 150 of the inner ring 210A with the value of the write data 315.

Subsequently, the node device 150 of the inner ring 210A may send a message 375 to storage 130. The message 375 may contain the same write data 315 that was provided by the cache client device 140. The storage device 130 may update the data associated with the address and/or key of the write data 315 within the storage 130 with the value of the write data 315.

The write operation of the multi-ring cache architecture 100 illustrated with respect to FIG. 3B may provide reduced latency in write operations. The write operation may be returned quickly by the outer ring 210B, while updates to the storage 130 may be handled asynchronously at a later point in time. As with the read operations, some accuracy may be affected, as the storage and the cache rings may be unsynchronized for some period of time, but, in an authorization system, an update to a counter may not be critical, and the faster return time of the multi-ring cache may be preferred over an embodiment which keeps the cache and the back-end storage 130 strictly in synchronization.

The multi-ring cache architecture 100 illustrated in FIGS. 2, 3A, and 3B provides multiple benefits. The outer ring 210B mainly serves clients while the inner ring 210A mainly persists updates to the storage 130, although, in some embodiments, read operations may be served from both the inner ring 210A as well as the outer ring 210B. To distribute the traffic evenly among the node devices 150 of the outer ring 210B and the node devices 150 of the inner ring 210A, consistent hashing algorithms may divide each node device 150 into many virtual nodes and/or sub-ranges, each covering a region (or range) of hashed values in the ring. Node devices 150 may be similarly placed on either ring clockwise.

In some embodiments, the inner ring 210A and the outer ring 210B may be configured to grow dynamically. When additional storage is needed (e.g., additional sub-ranges are to be added to either ring), a new node device 150 may be added to the end of the inner ring 210A or outer ring 210B. Adding a new node device to the end of a cache ring 210A, 210B may involve inserting the node device (e.g., as part of a linked list) between a tail/last node device 150 of the cache ring 210A, 210B and the first node device 150 of the cache ring 210A, 210B. Because a hashing or other mapping algorithm of the cache client device 140 may be dynamically updated, read and/or write requests may be dynamically transferred to the new node, and the new node may be able to immediately provide caching benefits to the multi-ring cache architecture 100. In a reverse manner, the inner ring 210A and the outer ring 210B may be configured to shrink, should a reduction in the data range being covered take place, or if node devices 150 of the multi-ring cache architecture 100 are needed for deployment elsewhere.

Moreover, as will be discussed in further detail herein, the multi-ring cache architecture 100 may provide additional benefits with respect to fault tolerance. When a node device 150 of the outer ring 210B fails, one node device 150 of the inner ring 210A is escalated as the replacement and then acts as a node device 150 of the outer ring 210B, while another node device 150 will replace the escalated node device 150 in the inner ring 210A. In the event that node device 150 of the inner ring 210A fails, it may be replaced with an uninitialized node device 150 without incurring extra traffic to the rest of the system. In some embodiments, the replacement node device 150 of the inner ring 210A may catch up faster by making a copy of its predecessor from a snapshot or an operation log, which may add processing overheads and costs. It may be relatively easy to determine which node device 150 of the inner ring 210A is the closest to a node device 150 of the outer ring 210B when the node device 150 of the outer ring 210B fails. A node device 150 of the outer ring 210B and a node device 150 of the inner ring 210A are close if they cover similar sub-ranges in their respective rings 210A, 210B and have a significant amount (e.g., more than half) of their content in common (e.g., their associated sub-ranges overlap). Embodiments of the present disclosure may provide additional benefits in that the inner ring 210A may have fewer node devices 150 than the outer ring 210B (e.g., M<N). Thus, the cache architecture 100 may achieve acceptable redundancy without needing to provide a one-to-one backup ratio between the inner ring 210A and the outer ring 210. Thus, embodiments of the present disclosure may achieve acceptable redundancy while using fewer node devices 150.

Figure 4A:
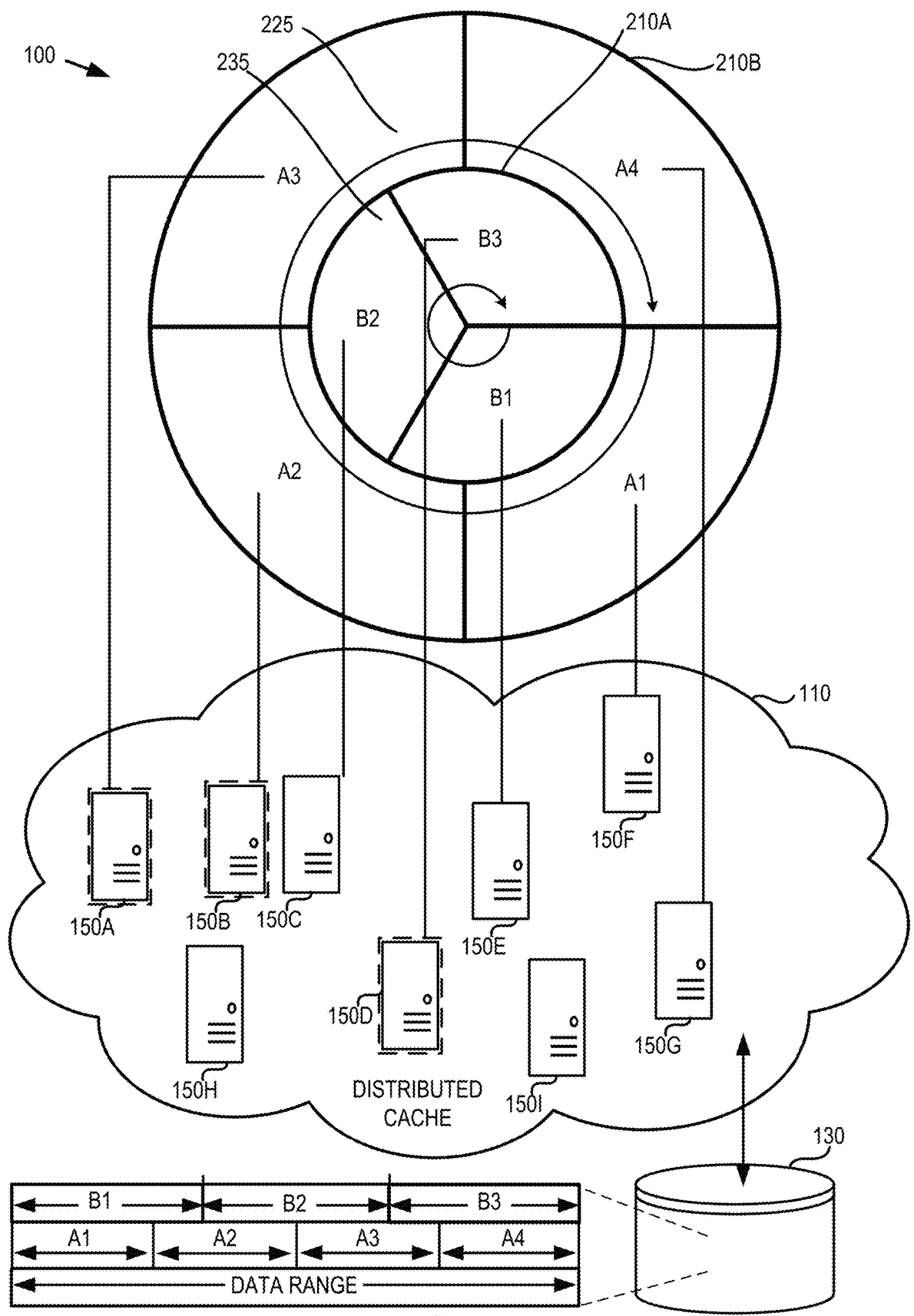
FIGS. 4A to 4C illustrate scenarios for managing a failure of a node device of the outer ring of the cache architecture, in accordance with some embodiments of the present disclosure.
Figure 4B:
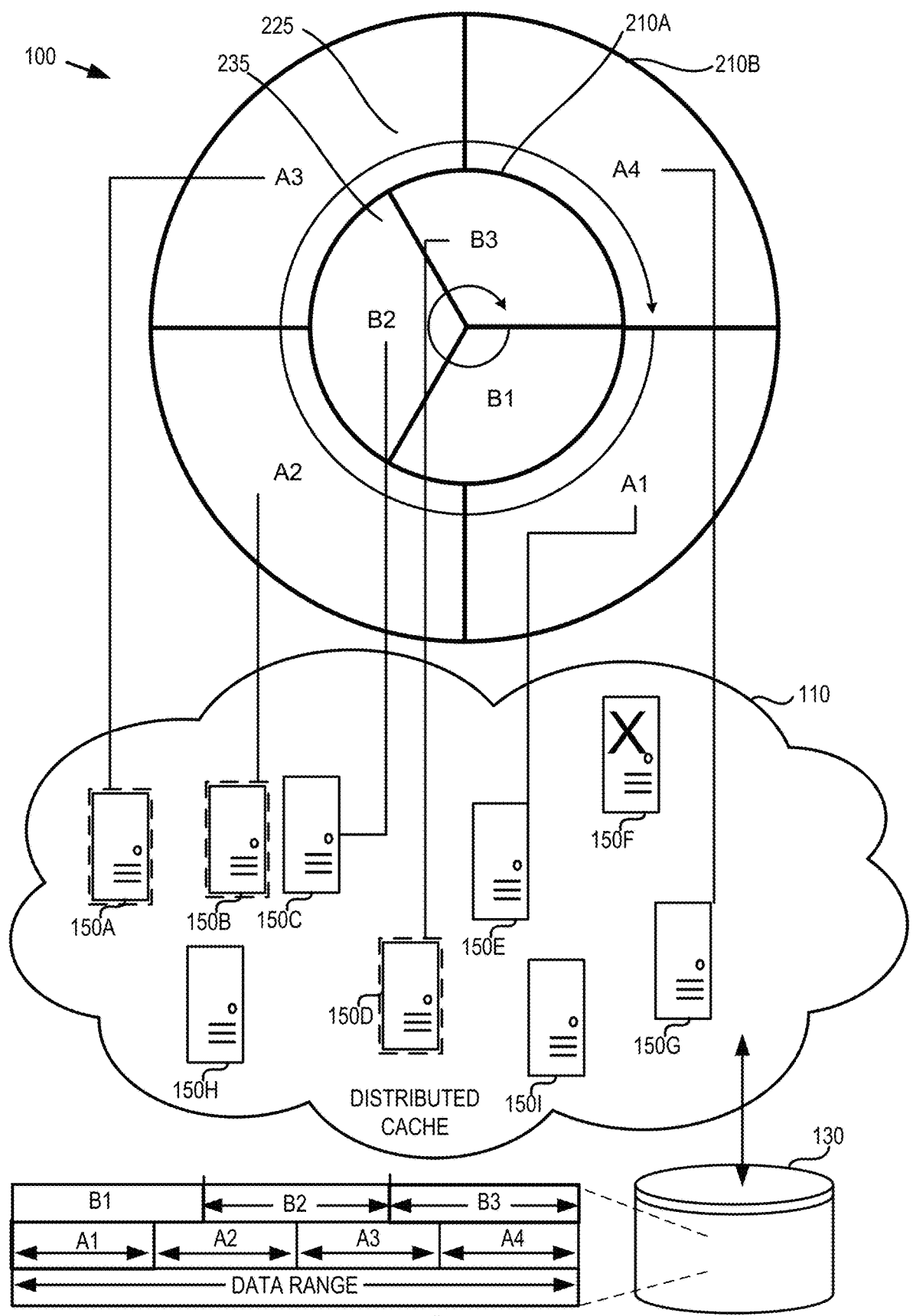
Figure 4C:
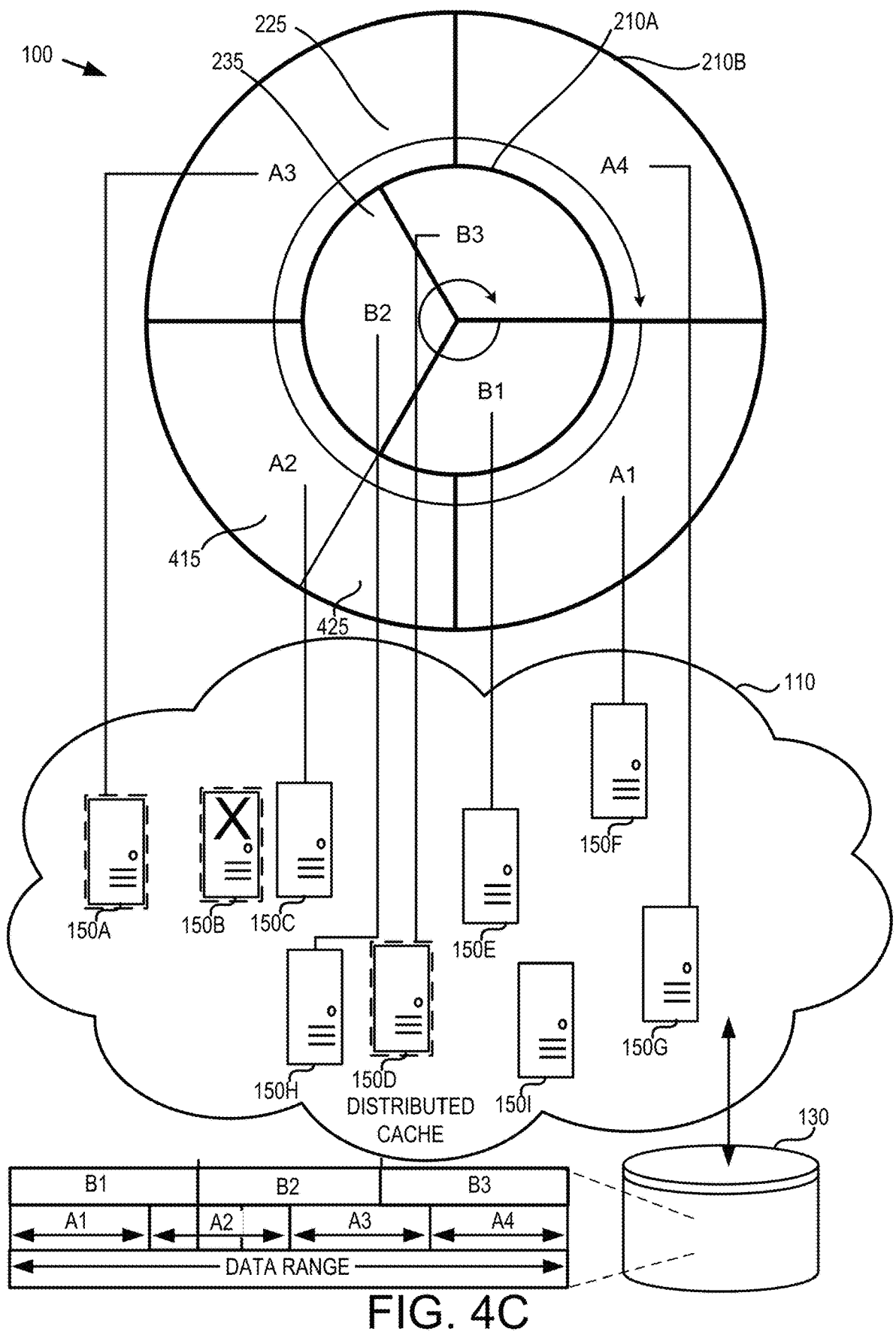

FIGS. 4A to 4C illustrate scenarios for managing a failure of a node device 150 of the outer ring 210B, in accordance with some embodiments of the present disclosure. A description of elements of 4A to 4C that have been previously described will be omitted for brevity.

FIG. 4A illustrates a configuration of node devices 150 among the inner ring 210A and the outer ring 210B. In FIG. 4A, the sub-ranges 225 associated with the outer ring 210B have been given designations of A1, A2, A3, and A4, while the sub-ranges 235 associated with the inner ring 210A have been given designations of B1, B2, and B3. Thus, the outer ring 210A is associated with four node devices 150 (N=4) and the inner ring 210B is associated with three node devices 150 (M=3). In FIGS. 4A to 4C, the data sub-ranges are illustrated circularly to illustrate an overlap between the underlying data ranges (e.g., the data addresses). A circular arrow is provided to illustrate the progression of the addresses and/or keys for the data of the storage 130 within the sub-ranges 225 associated with the outer ring 210B and the sub-ranges 235 associated with the inner ring 210A.

In some embodiments, the number of sub-ranges 225 associated with the outer ring 210B exceed the number of sub-ranges 235 associated with the inner ring 210A (e.g., N>M). Because the sub-ranges 225 associated with the outer ring 210B and the sub-ranges 235 associated with the inner ring 210A cover a same data range of the storage 130, the sub-ranges 225 associated with the outer ring 210B may be smaller (e.g., cover fewer addresses and/or keys) than the sub-ranges 235 associated with the inner ring 210A. For example, the sub-ranges 235 associated with the inner ring 210A may cover a larger range of data addresses than the sub-ranges 225 associated with the outer ring 210B. The embodiments of the present disclosure are not limited to such a configuration. In some embodiments, the number of sub-ranges 225 associated with the outer ring 210B may be equal to the number of sub-ranges 235 associated with the inner ring 210A (e.g., N=M). Because of the arrangements of the respective sub-ranges 225, 235 of the inner and outer rings 210A, 210B, sub-range B1 of the inner ring 210A overlaps sub-ranges A1 and A2 of the outer ring 210B, sub-range B2 of the inner ring 210A overlaps sub-ranges A2 and A3 of the outer ring 210B, and sub-range B3 of the inner ring 210A overlaps sub-ranges A3 and A4 of the outer ring 210B.

In the scenario of FIG. 4A, node device 150F has been associated with sub-range A1 of the outer ring 210B, node device 150B has been associated with sub-range A2 of the outer ring 210B, node device 150A has been associated with sub-range A3 of the outer ring 210B, and node device 150G has been associated with sub-range A4 of the outer ring 210B. In addition, node device 150E has been associated with sub-range B1 of the inner ring 210A, node device 150C has been associated with sub-range B2 of the inner ring 210A, and node device 150D has been associated with sub-range B3 of the inner ring 210A. Node devices 150H and 150I are not assigned to a cache ring, and are thus available as spares.

FIG. 4B illustrates an embodiment in which a node device 150F associated with the outer ring 210B fails, and is replaced according to some embodiments of the present disclosure. Referring to FIG. 4B, if node device 150F fails, a node device 150 is no longer present for sub-range A1 of the outer ring 210B. To compensate for this loss, node device 150E may be selected to replace node device 150F. Node device 150E may be selected because the data sub-range B1 to which node device 150E was previously assigned completely contains the data sub-range A1 which was previously assigned to the failed node device 140F. That is to say that the storage (e.g., storage 190 of FIG. 1) of the node device 150E has already cached the values associated with the sub-range A1 of the outer ring 210B due to the overlap between the sub-ranges A1 and B1. Thus, the node device 150E may be escalated to the outer ring 210B and may begin caching the data sub-range A1 of the outer ring 210B and responding to client requests for data from the sub-range A1.

A spare node device 150, in this example node device 150I, may be escalated to managing the data sub-range B1 of the inner ring 210A. Because the node device 150I is empty of any cached values, it can load its cache contents for the sub-range B1 through updates from the outer ring 210B or by an asynchronous load of data from the storage 130. However, because the inner ring 210A does not directly respond, in some embodiments, to client requests, the burden on the storage 130 may be reduced by spacing out the loading of the replacement node device 150I.

The example of FIG. 4B illustrates that embodiments according to the present disclosure provide quick replacement in the event of a node device failure on the outer ring 210B while reducing a load on the storage 130 associated with providing a replacement node device 150.

FIG. 4C illustrates an embodiment in which a node device 150B associated with the outer ring 210B fails, and is replaced according to some embodiments of the present disclosure. Referring to FIG. 4C, if node device 150B fails, a node device 150 is no longer present for sub-range A2 of the outer ring 210B. To compensate for this loss, node device 150C may be selected to replace node device 150B. Node device 150C of the inner ring 210A may be selected and moved to the outer ring 210B because the data sub-range B2 to which node device 150C was previously assigned (prior to the failure of node device 140B) partially overlaps the data sub-range A2 which was previously assigned to the failed node device 140B.

FIG. 4C illustrates a scenario in which the replacement node device only partially contains the data for the sub-range 225 of the outer ring 210B that it is replacing. That is to say that the storage (e.g., storage 190 of FIG. 1) of the node device 150C has already cached a first portion 415 of the values associated with the sub-range A2 of the outer ring 210B, but does not contain a second portion 425 of the values associated with the sub-range A2 of the outer ring 210B. In some embodiments, the node device 150C may be selected because its sub-range B2 has the largest overlap with the failed sub-range A2 of the outer ring 210B. The node device 150C may be escalated to the outer ring 210B and may begin caching the data sub-range A2 of the outer ring 210B and responding to client requests for data from the sub-range A2.

For the second portion 425 of the values associated with the sub-range A2 of the outer ring 210B that are not present in the storage of the node device 150C, a number of options may be performed. In some embodiments, the 150C may pre-load the missing second portion 425 from the storage 130 prior to responding to client requests, but the embodiments of the present disclosure are not limited to this scenario.

In some embodiments, the node device 150C may delay loading the second portion 425 until it is requested by a client request. The client request may return a data not found, as illustrated in FIG. 3A, and the individual missing data may be loaded from storage 130. This may reduce the amount of burden that is placed on the storage 130 in response to the failure of the node device 150B.

In some embodiments, the node device 150C may load the second portion 425 from the adjacent node device 150 (in this case, node device 150E) that contains the cached values of the sub-range B1 of the inner ring 210A. This option may result in the replacement node device 150C having the majority of the data cached (e.g., including the second portion 425 of the data) without having to access the storage 130 to achieve the data load.

A spare node device 150, in this example node device 150H, may be escalated to managing the data sub-range B2 of the inner ring 210A. Because the node device 150H is empty of any cached values, it can load its cache contents for the sub-range B2 through updates from the outer ring 210B or by an asynchronous load of data from the storage 130. However, because the inner ring 210A does not directly respond, in some embodiments, to client requests, the burden on the storage 130 may be reduced by spacing out the loading of the replacement node device 150H.

As with the example of FIG. 4B, the example of FIG. 4C illustrates that embodiments according to the present disclosure provide quick replacement in the event of a node device failure on the outer ring 210B while reducing a load on the storage 130 associated with providing a replacement node device 150.

The benefits of the embodiments of the present disclosure with respect to replacement of node devices 150 may be seen with an analysis of scenarios in which the outer ring 210B contains N node devices 150 and the inner ring 210A contains M node devices 150. Three scenarios are envisioned: where M<N<2M and memory is not considered, where 2M<N<3M, and scenarios in which memory constraints are considered.

In one example scenario, a configuration is envisioned in which M<N<2M and memory is not considered. The outer ring 210B of N node devices 150 may be represented as N intervals between 0 and N as {[0, 1), [1, 2), . . . , [(N−1, N]} (also referred to herein as outer intervals). The N intervals are similar to the data sub-ranges 225 of the outer ring 210B described herein.

The inner ring 210A of M node devices 150 may be represented as M intervals of size N/M over the same range of 0 to N as follows: {[0, k), [k, 2k), . . . , [N−2k, N-k), [N-k, N]}, where k=N/M (also referred to herein as inner intervals). The M intervals are similar to the data sub-ranges 235 of the inner ring 210A described herein. Since it is assumed that N>=M for this scenario, the M intervals corresponding to the M inner node devices 150 will be larger than the N intervals corresponding to the N outer node devices 150, meaning k>=1.

By using a same consistent hashing algorithm for the inner and outer node devices 150, a uniform distribution may be provided with the same amount of entries in each node device 150. An assumption for this to work is that consistent hashing behaves like a proper hash function. The problem of finding the fraction of data that an inner ring 210A node device 150 shares (if picked correctly) with the outer ring 210B node device 150 it is replacing may be reduced to finding the k length interval with the largest intersection with the unit interval of the outer ring 210B node device 150 being replaced. This intersection represents the cache entries that the inner ring 210A node device 150 and the outer ring 210B node device 150 it is replacing have in common.

For example, the simplest case is when replacement is made of the n=0 node device 150 (see, e.g., FIG. 4B). In such a scenario, 100% coverage may be achieved by the m=0 node as [0, 1] is wholly contained in [0, k] since k>=1.

If k is constrained to k<2 (so the outer ring 210B is less than twice as big as the inner ring 210A), it can be seen that the intervals corresponding to the outer ring 210B will either fall entirely in a single interval corresponding to the inner ring 210A or straddle two consecutive inner ring, k-length, intervals. As a result, an inner ring interval may be guaranteed that intersects at least half of the outer ring interval being replaced.

So for each outer interval starting at n and ending at n+1, this interval is going to be straddled by two inner intervals [km, km+k] and [km+k, km+2k]. Thus the inner interval that has the largest intersection will be one of: all of the entries in the inner interval (entirely contained in the $m^{th}$ inner interval); the fraction of entries between the start of the outer interval and the end of the inner interval (picking the $m^{th}$ inner interval, e.g., the left side); or the fraction of entries from the end of the $m^{th}$ inner interval to the end of the $n^{th}$ outer interval (picking the $(m+1)^{th}$ inner interval, e.g., the right side)

To determine the average performance, the 'error' or proportion of entries of each outer node that are lost when promoting the appropriate inner node device 150 may be estimated (i.e., what parts of the outer interval are lost when the outer interval is intersected with the best inner interval choice.

If N=4 and M=3 (k=4/3), the error ratios for each of the 4 outer intervals are:

N=0 is [0,1], the best choice is M=0 which would be [0, 4/3]. Full intersection is achieved, so the error is 0.

N=1 is [1,2], the best choice is M=1 which would be [4/3, 8/3]. This means that [1,4/3] is lost from the outer interval which has a length of ⅓. Thus, an error of ⅓ is obtained.

N=2 is [2,3], the best choice is again actually M=1 which would be [4/3, 8/3]. Now [8/3, 3] is missing from the outer interval, which again becomes an error of ⅓.

N=3 is [3,4], the best choice is M=2 which is [8/3, 4]. Full intersection is achieved, so the error is 0.

The set of errors is [0, 1/3, 1/3, 0], which when added up and divided by the length of the full outer interval (which is N=4) becomes 2/12=about 18%, which is the expected error rate.

Similarly, if N=10 and M=9, the error ratios end up being: [0, 1/9, 2/9, 3/9, 4/9, 4/9, 3/9, 2/9, 1/9, 0] which when summed results in an expected error rate 20/81 or about 25%.

From the experiments, it can be seen that the error terms are generally somewhat uniformly distributed between 0 and 1/2 as long as M and N are somewhat close in value. With this information, it may be estimated that the error summed up is going to be approximately the area under a curve that has values uniformly varying between y=0 and y=0.5 from x=0 to x=1. (Using the assumption that, at worst, an inner interval may be found that covers half of the outer interval.) This is an integral that will come out to approximately 0.25. Thus it may be concluded that the multi-ring cache architecture 100 according to some embodiments of the present disclosure is going to promote an inner ring 210A node device 150 that has about 75% of the cache entries of the node device 150 it is replacing, given that the best node device 150 is selected and that M<N<2M.

In one example scenario, a configuration is envisioned in which 2M<N<3M and memory is not considered. In this scenario, approximately every other outer interval is going to entirely fall within an inner interval. For N=5 and M=2: n=0, n=1, and n=3 and n=4 are all contained within a single inner interval. n=2 or [2,3] is going to be straddled between [0,2.5]and [2.5,3].

Thus, for half the intervals, 100% of the entries will be matched and, for the other half, 75% on average will be matched, resulting in an expected accuracy of 87.5%.

If all constraints on N other than N>M are removed, a similar result may take place. If N>kM then N*(k—1)/k intervals will be fully contained within an M interval. Then, the analysis from the previous scenario can be applied on the N/k remaining intervals. This gives an accuracy of 1−0.25*1/k if N>kM. Thus, as k goes up, the accuracy gets closer and closer to 100% accuracy.

In one example scenario, a configuration is envisioned which factors in the assumption that the N node devices 150 of the outer ring 210B may have more memory in total than the M node devices 150 of the inner ring 210A.

Assuming the node devices 150 have the same size, M node devices 150 may store MX entries and N node devices 150 may store NX entries, where X is the number of entries that fit on a node. The value X may be abstracted out, resulting in the intervals from the prior scenarios. Thus, assuming a reasonable and fair eviction policy, the node devices 150 of the inner ring 210A may be penalized by a factor of M/N due to the assumption of equal node sizes for inner ring 210A and outer ring 210B node devices 150, meaning that data may be evicted at that ratio if memory efficiency is desired and to achieve 100% memory utilization. Since a fair eviction policy was assumed, it may be concluded that this memory constraint is independent of the distribution of the keys by the consistent hashing algorithm.

Thus a final value for the fraction of data that the best choice of inner ring 210A node device 150 will have when it replaces an outer ring 210B node device 150 is 0.75*M/N if M and N are somewhat close.

If N>>M (e.g., k is big) then this changes to (1−0.25*1/k)*(1/k) where k=N/M, which approaches 1/k as k increases (note: 1/k is going to dominate here. If k=10, a 10% hit rate is achieved)

Assuming the cache layers on the inner ring 210A and the outer ring 210B are perfectly consistent, it should be possible to achieve full data integrity during a single node device 150 replacement regardless of how many node devices 150 are in each ring, at the cost of a slight latency increase for certain keys immediately after a node device 150 replacement.

Figure 5:
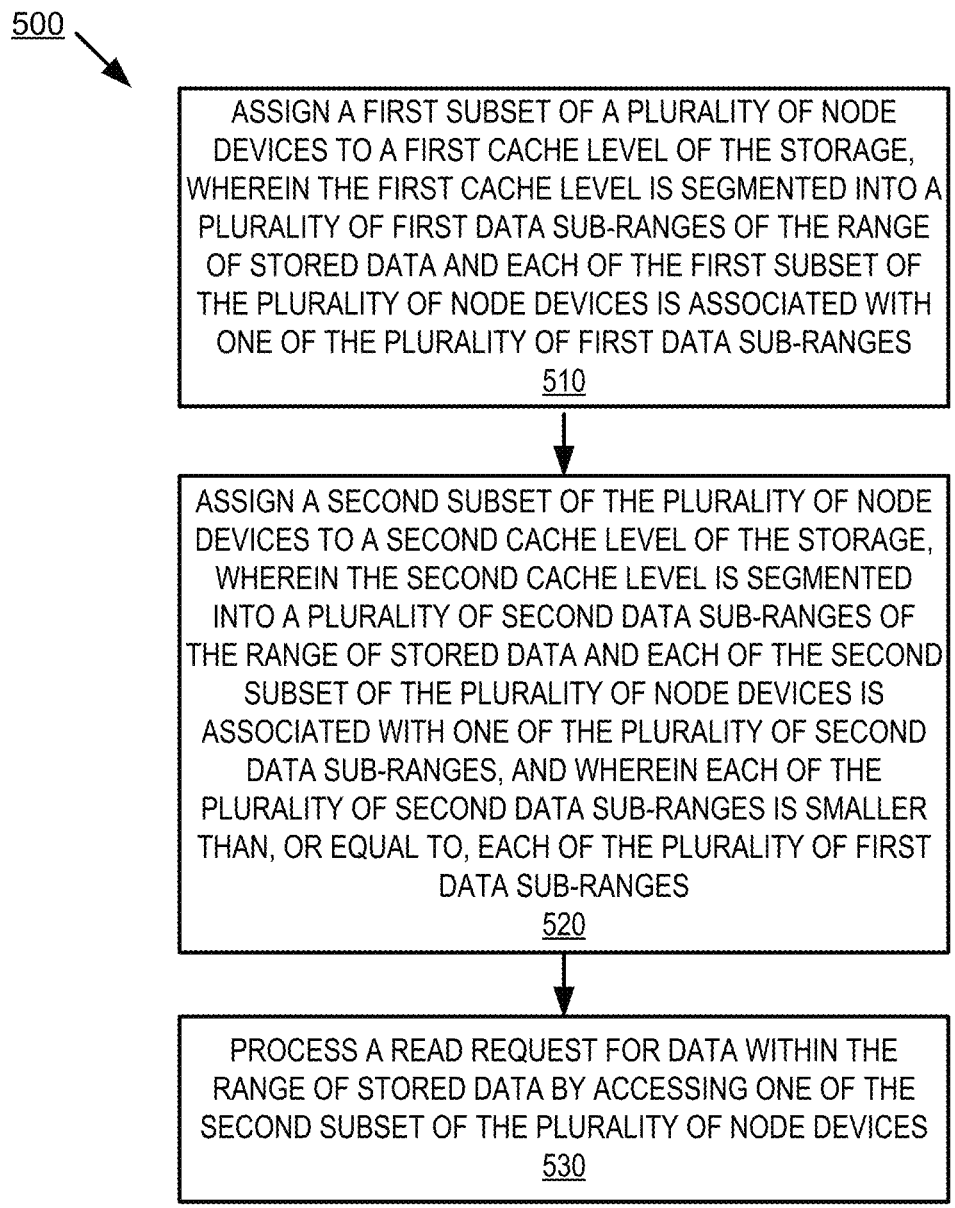
FIG. 5 is a flow diagram of a method of operating a distributed cache architecture of storage comprising a range of stored data, in accordance with one or more aspects of the disclosure.

FIG. 5 is a flow diagram of a method 500 of operating a distributed cache architecture 100 of storage 130 comprising a range of stored data, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by cache client device 140 and/or the one or more of the node devices 150 of at least FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic assigns a first subset of a plurality of node devices to a first cache level of the storage, wherein the first cache level is segmented into a plurality of first data sub-ranges of the range of stored data and each of the first subset of the plurality of node devices is associated with one of the plurality of first data sub-ranges. The plurality of node devices may be, for example, similar to the node devices 150 discussed herein with respect to FIGS. 1-4C. The first cache level may be similar to the inner ring 210A described herein. The storage may be similar to the storage 130 described herein. The plurality of first data sub-ranges may be similar to sub-ranges 235 associated with one of the M node devices 150 of the inner ring 210A, as described herein.

At block 520, the processing logic assigns a second subset of the plurality of node devices to a second cache level of the storage, wherein the second cache level is segmented into a plurality of second data sub-ranges of the range of stored data and each of the second subset of the plurality of node devices is associated with one of the plurality of second data sub-ranges, and wherein each of the plurality of second data sub-ranges is smaller than, or equal to, each of the plurality of first data sub-ranges. The second cache level may be similar to the outer ring 210B described herein. The plurality of second data sub-ranges may be similar to sub-ranges 225 associated with one of the N node devices 150 of the outer ring 210B, as described herein.

In some embodiments, contents of the second data sub-ranges associated with respective ones of second subset of the plurality of node devices are loaded from the storage. In some embodiments, contents of the first data sub-ranges associated with respective ones of first subset of the plurality of node devices are loaded from one or more of the second subset of the plurality of node devices. In some embodiments, a first data sub-range associated with a first node device of the first subset of the plurality of node devices overlaps with two of the plurality of second data sub-ranges.

At block 530, the processing logic processes a read request for data within the range of stored data by accessing one of the second subset of the plurality of node devices. The read request may be similar to request 145 or 245, described herein, at least with respect to FIGS. 2 and 3A.

In some embodiments, responsive to a failure of a failed node device of the second subset of the plurality of node devices, a replacement node device of the first subset of the plurality of node devices is moved from the first subset of the plurality of node devices to the second subset of the plurality of node devices by associating, with the replacement node device, the second data sub-range that was associated with the failed node device.

In some embodiments, the range of stored data comprises a plurality of keys, and the apparatus further comprises a cache client. A processing device of the cache client may be configured to: receive a request to read a stored key of the plurality of keys; generate a hash of the key, wherein the hash is associated with a target second data sub-range of the plurality of second data sub-ranges; and access a second node device of the second subset of the plurality of node devices that is associated with the target second data sub-range to retrieve the stored key.

In some embodiments, the range of stored data comprises a plurality of keys, and a processing device of a second node device of the second subset of the plurality of node devices is configured to: receive a request to write a stored key of the plurality of keys, the stored key associated with the second data sub-range that is associated with the second node device and with a first data sub-range of the plurality of first data sub-ranges that is associated with a first node device of the first subset of the plurality of node devices; update a value of the stored key within the second data sub-range; and access the first node device that is associated with the first data sub-range to update the stored key within the first data sub-range. In some embodiments, a processing device of the first node device is configured to: update a value of the stored key within the first data sub-range that is associated with the first node device; and access the storage to update the stored key within the range of stored data.

In some embodiments, the range of stored data comprises a plurality of keys, and a processing device of a second node device of second subset of the plurality of node devices is configured to: receive, from a cache client, a request to read a stored key of the plurality of keys, the stored key associated with the second data sub-range that is associated with the second node device and with a first data sub-range of the plurality of first data sub-ranges that is associated with a first node device of the first subset of the plurality of node devices; determine if the stored key is present within the second data sub-range that is associated with the second node device; responsive to determining that the stored key is present within the second data sub-range, return a value of the stored key to the cache client; and responsive to determining that the stored key is present within the second data sub-range, return a value indicating failure to the cache client, and access the first node device that is associated with the first data sub-range to retrieve the stored key within the first data sub-range for storage within the second data sub-range.

Figure 6:
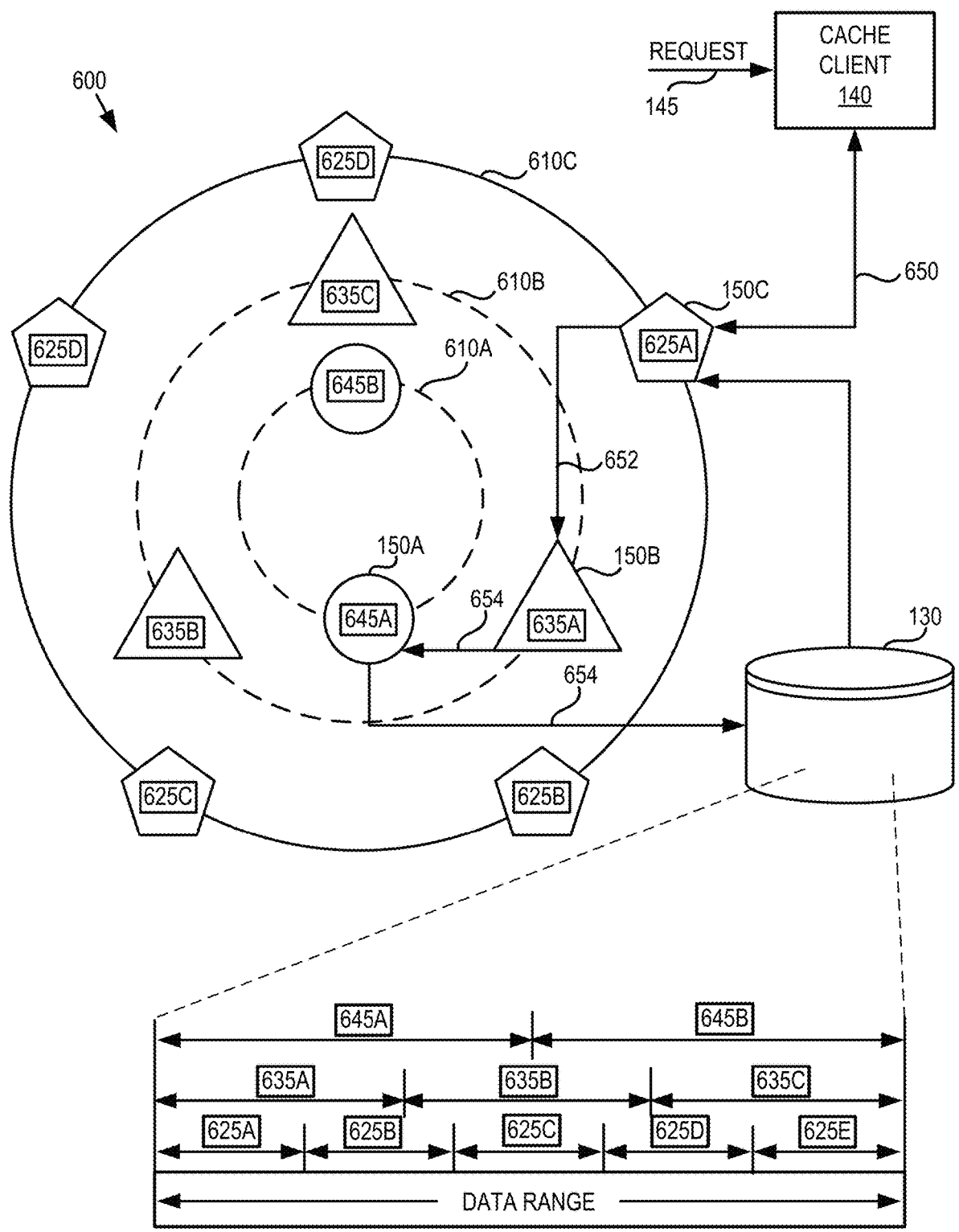
FIG. 6 is a schematic diagram illustrating a configuration of rings of a cache architecture, in accordance with one or more aspects of the present disclosure.

In some of the previous figures, a multi-ring cache configuration 100 has incorporated two cache rings, an inner ring 210A and an outer ring 210B. However, embodiments of the present disclosure are not limited to such a configuration. FIG. 6 is a schematic diagram illustrating a configuration of rings 610 of a cache architecture 600, in accordance with one or more aspects of the present disclosure.

Referring to FIGS. 1 and 6, a multi-ring cache architecture 600 may include a first ring 610A (e.g., a first cache level), a second ring 610B (e.g., a second cache level), and a third ring 610C (e.g., a third cache level). Each of the first, second and third rings 610A, 610B, 610C may include a plurality of node devices 150. Each of the node devices 150 of the first, second and third rings 610A, 610B, 610C may be configured to store data sub-ranges of the data stored in storage 130.

For example, third ring 610C may include N node devices 150, where N is an integer greater than 1. The range of data stored in storage 130 may be categorized into a plurality of sub-ranges 625, and each of the sub-ranges 625 may be respectively associated with one of the N node devices 150 of the third ring 610C. For example, if the range of data of the storage 130 is S bytes (where S is a positive integer greater than 0), then a plurality of non-overlapping sub-ranges 625 (e.g., a third set of sub-ranges 625) of the S byes may be assigned and/or associated with one of the node devices 150 of the third ring 610C. In some embodiments, the sub-ranges 625 may be of equal size. In such embodiments, for example, each of the node devices 150 of the third ring 610C may be assigned and/or associated with S/N bytes of the data of the storage 130.

The second ring 610B may include M node devices 150, where M is an integer greater than or equal to N. As with the third ring 610C, the range of data stored in storage 130 may be categorized into a plurality of non-overlapping sub-ranges 635 (e.g., a second set of sub-ranges 635), and each of the sub-ranges 635 may be respectively associated with one of the M node devices 150 of the second ring 610B. For example, if the range of data of the storage 130 is S bytes (where S is a positive integer greater than 0), then a plurality of sub-ranges 635 of the S byes may be assigned and/or associated with one of the node devices 150 of the second ring 610B. In some embodiments, the sub-ranges 635 may be of equal size. In such embodiments, for example, each of the node devices 150 of the second ring 610B may be assigned and/or associated with S/M bytes of the data of the storage 130.

The first ring 610A may include P node devices 150, where P is an integer less than or equal to M. As with the second and third rings 610B, 610C, the range of data stored in storage 130 may be categorized into a plurality of non-overlapping sub-ranges 645 (e.g., a first set of sub-ranges 645), and each of the sub-ranges 645 may be respectively associated with one of the P node devices 150 of the first ring 610A. For example, if the range of data of the storage 130 is S bytes (where S is a positive integer greater than 0), then a plurality of sub-ranges 645 of the S byes may be assigned and/or associated with one of the node devices 150 of the first ring 610A. In some embodiments, the sub-ranges 645 may be of equal size. In such embodiments, for example, each of the node devices 150 of the first ring 610A may be assigned and/or associated with S/P bytes of the data of the storage 130.

Due to the nature of the first through third rings 610A, 610B, 610C, each of the data values (e.g., the addresses and/or keys) of the storage 130 may be mapped to three sub-ranges: a first sub-range 645 of data assigned to a node device 150 of the first ring 610A, a second sub-range 635 of data assigned to a node device 150 of the second ring 610B, and a third sub-range 625 of data assigned to a node device 150 of the third ring 610C. In some embodiments, where N>M>P, a size of the first sub-range 645 may be larger than a size of the second sub-range 635, and the size of the second sub-range 635 may be larger than a size of the third sub-range 625.

FIG. 6 provides an example of the multi-ring cache architecture 600 where the first ring 610A contains two node devices (e.g., P=2), the second ring 610B contains three node devices 150 (e.g., M=3), and the third ring 610C contains five node devices 150 (e.g., N=5). The number of node devices 150 in each of the first, second and third rings 610A, 610B, 610C of FIG. 6 is merely an example for illustration, and is not intended to limit the embodiments of the present disclosure.

As illustrated in FIG. 6, a data range of the storage 130 may be allocated into a plurality of first sub-ranges 645 that are each assigned and/or associated with a node device 150 of the first ring 610A, a plurality of second sub-ranges 635 that are each assigned and/or associated with a node device 150 of the second ring 610B, and into a plurality of third sub-ranges 625 that are each assigned and/or associated with a node device 150 of the third ring 610C. For example, the data range of the storage 130 may be allocated into five sub-ranges 625A-625E, and each of the five sub-ranges 625A-625E may be assigned and/or associated with a respective one of the five node devices 150 of the third ring 610C. Additionally, the data range of the storage 130 may also be allocated into three sub-ranges 635A-635C, and each of the three sub-ranges 635A-635C may be assigned and/or associated with a respective one of the three node devices 150 of the second ring 610B. Additionally, the data range of the storage 130 may also be allocated into two sub-ranges 645A and 645B, and each of the two sub-ranges 645A and 645B may be assigned and/or associated with a respective one of the two node devices 150 of the first ring 610A.

In some embodiments, the node devices 150 of the first through third rings 610A, 610B, 610C may be configured to initially load the data of the storage 130 asynchronously (e.g., at startup of the cache architecture 600). For example, the node device 150C of the third ring 610C that is associated with the data sub-range 625A may be configured to load the associated data of sub-range 625A from storage 130 asynchronously in an initial (e.g., a start-up) operation. The data of the sub-range 625A may be loaded and/or initialized, for example, into storage 190 (see FIG. 1). The other node devices 150 of the third ring 610C that are associated with data sub-ranges 625B-625E may be similarly asynchronously loaded and/or initialized.

Additionally, the node device 150B of the second ring 610B that is associated with the data sub-range 635A may be configured to load the associated data of sub-range 635A from storage 130 asynchronously in an initial (e.g., a start-up) operation. The other node devices 150 of the second ring 610B that are associated with data sub-ranges 635B-635C may be similarly asynchronously loaded and/or initialized. The node device 150A of the first ring 610A that is associated with the data sub-range 645A may be configured to load the associated data of sub-range 645A from storage 130 asynchronously in an initial (e.g., a start-up) operation. The other node device 150 of the first ring 610A that is associated with data sub-range 645B may be similarly asynchronously loaded and/or initialized.

In operation, the node devices 150 of the third ring 610C are configured to handle data read and write operations from incoming requests 145. For example, the cache client device 140 may receive a request 145 including a data read or write request. The cache client device 140 may analyze the request 145 to determine with which data sub-range 625 of the third ring 610C the request 145 is associated. In some embodiments, determining the appropriate data sub-range 625 of the request 145 may involve analyzing an address and/or key of data associated with the request 145. In some embodiments, determining the appropriate data sub-range 625 of the request 145 may involve referencing a mapping table that maps an address and/or key of data associated with the request 145 to one of the sub-ranges 625 of the third ring 610C. In some embodiments, determining the appropriate data sub-range 625 of the request 145 may involve performing a hashing operation on an address and/or key of data associated with the request 145, which may indicate one of the sub-ranges 625 of the third ring 610C.

Once the appropriate sub-range 625 is determined, the request may be sent by a command transmission 650 to the node device 150 (e.g., node device 150C) that is assigned to and/or associated with the appropriate sub-range 625. The node device 150C, upon receipt of the command transmission 650, may determine if the requested operation is a read or a write operation.

If the operation is a read operation, the node device 150C may determine if the address associated with the read operation is currently populated/present in the data the node device 150C has loaded for the data sub-range 625. If the data is present for the provided address and/or key, it will be returned to the cache client device 140. If it is not present, a data not found error may be returned to the cache client device 140. In such a situation, the data that was not found may be asynchronously loaded after the response is provided to the cache client device 140. In some embodiments, the data may be asynchronously loaded from the storage 130 and/or the second ring 610B. Additional details with respect to the read operation are similar to those discussed herein with respect to FIG. 3A.

If the operation is a write operation, the updated data of the data sub-range 625 stored with the node device 150C may be updated. In addition, a write request 652 may be provided from the node device 150C of the third ring 610C to one of the node devices 150 (e.g., node device 150B) of the second ring 610B. For example, the node device 150C of the third ring 610C may analyze the address and/or key of the updated data to determine with which data sub-range 635 of the second ring 610B the request 145 is associated. In some embodiments, determining the appropriate data sub-range 635 may involve referencing a mapping table that maps the address and/or key of the data of the request 145 to one of the sub-ranges 635 of the second ring 610B. In some embodiments, determining the appropriate data sub-range 635 may involve performing a hashing operation on the address and/or key of the data of the request 145, which may indicate one of the sub-ranges 635 of the second ring 610B.

The write request 652 from the node device 150C of the third ring 610C to one of the node devices 150B of the second ring 610B may indicate that the one of the node devices 150B of the second ring 610B is to update the associated value within its data sub-range 635. This may allow the node device 150B of the second ring 610B to keep its data current with changing values of the data caused by write requests received by the cache client device 140 and processed by the third ring 610C.

In addition, a write request 654 may be provided from the node device 150B of the second ring 610B to one of the node devices 150 (e.g., node device 150A) of the first ring 610A. For example, the node device 150B of the second ring 610B may analyze the address and/or key of the updated data to determine with which data sub-range 645 of the first ring 610A the request 145 is associated. This determination may be made in a similar manner as discussed herein with respect to the second and third data sub-ranges 625, 635.

The write request 654 from the node device 150B of the second ring 610B to one of the node devices 150A of the first ring 610A may indicate that the one of the node devices 150A of the first ring 610A is to update the associated value within its data sub-range 645. This may allow the node device 150A of the first ring 610A to keep its data current with changing values of the data caused by write requests received by the cache client device 140 and processed by the third ring 610C.

Upon receipt of the write request 654 at the first ring 610A, the associated node device 150A of the first ring 610A may also provide an asynchronous write request 656 to the storage 130 to update the data value on the storage 130 as well.

The multi-ring cache architecture 600 may provide additional benefits with respect to fault tolerance. Should a node device 150 of the third ring 610C fail, it may be replaced by a node device 150 of the second ring 610B in a manner similar to those discussed herein with respect to FIGS. 4A to 4C. The vacant portion of the second ring 610B previously covered by the replacement node device 150 from the second ring 610B may be further replaced by a node device 150 of the first ring 610A. Since the node device 150 from the first ring 610A may contain some or all of the cache values of the prior node device 150B of the second ring 610B, the additional replacement node within the second ring 610B may begin operation with a large portion of the cache data already present. The vacant portion of the first ring 610A previously covered by the replacement node device 150 from the first ring 610A may be further replaced by a spare node device 150. In this way, the multi-ring cache architecture 600 may reduce an amount of traffic to a storage 130 during a failure, while maintaining a rapid response time to requests 145.

Figure 7:
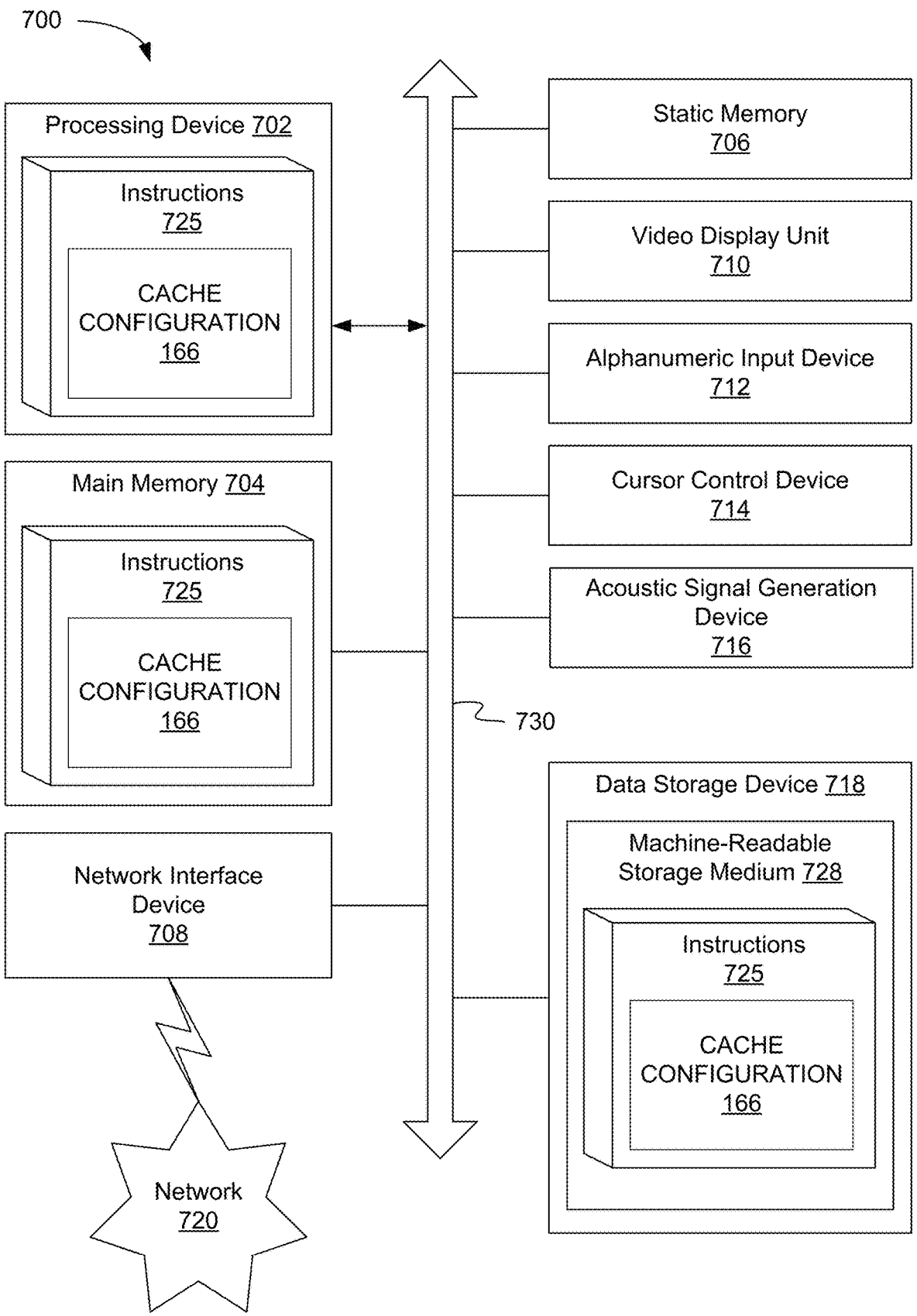
FIG. 7 is a block diagram of an example computing device that may perform one or more of the operations described herein, in accordance with one or more aspects of the disclosure.

FIG. 7 is a block diagram of an example computing device 700 that may perform one or more of the operations described herein, in accordance with one or more aspects of the disclosure. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also include one or more special-purpose processing devices such as an application specific integrated circuit (ASIC), a field programmable gate array (FPGA), a digital signal processor (DSP), network processor, or the like. The processing device 702 may execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for a cache configuration component, e.g., cache configuration 166, for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "detecting," "activating," "controlling," "directing", "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A distributed cache apparatus comprising:
   storage comprising a range of stored data,
      wherein a first cache level of the storage is segmented into a plurality of first data sub-ranges of the range of stored data, and each of the plurality of first data sub-ranges is associated with one of a first subset of a plurality of node devices, wherein a second cache level of the storage is segmented into a plurality of second data sub-ranges of the range of stored data, and each of the plurality of second data sub-ranges is associated with one of a second subset of the plurality of node devices, and wherein each of the plurality of second data sub-ranges is smaller than each of the plurality of first data sub-ranges; and a processing device to process a read request for data within the range of stored data by accessing one of the second subset of the plurality of node devices.

2. The apparatus of claim 1, wherein contents of the first data sub-ranges associated with respective ones of first subset of the plurality of node devices are loaded from one or more of the second subset of the plurality of node devices.

3. The apparatus of claim 1, wherein a third cache level is segmented into a plurality of third data sub-ranges of the range of stored data, and each of the plurality of third data sub-ranges is associated with one of a third subset of the plurality of node devices, and
wherein each of the plurality of second data sub-ranges is smaller than each of the plurality of third data sub-ranges.

4. The apparatus of claim 1, wherein, responsive to a failure of a failed node device of the second subset of the plurality of node devices, a replacement node device of the first subset of the plurality of node devices is moved from the first subset of the plurality of node devices to the second subset of the plurality of node devices by associating, with the replacement node device, a second data sub-range of the plurality of second data sub-ranges that was associated with the failed node device.

5. The apparatus of claim 1, wherein a first data sub-range associated with a first node device of the first subset of the plurality of node devices overlaps with two of the plurality of second data sub-ranges.

6. The apparatus of claim 1, wherein the range of stored data comprises a plurality of keys, and wherein the processing device is further to:
receive the read request to read a stored key of the plurality of keys;
generate a hash of the key, wherein the hash is associated with a target second data sub-range of the plurality of second data sub-ranges; and
access a second node device of the second subset of the plurality of node devices that is associated with the target second data sub-range to retrieve the stored key.

7. The apparatus of claim 6, wherein, responsive to determining that the stored key is not present in the target second data sub-range, returning an error indicating that the stored key is not available.

8. The apparatus of claim 1, wherein the range of stored data comprises a plurality of keys, and wherein a processing device of a second node device of the second subset of the plurality of node devices is to:
receive a request to write a stored key of the plurality of keys, the stored key associated with a second data sub-range of the plurality of second data sub-ranges that is associated with the second node device and with a first data sub-range of the plurality of first data sub-ranges that is associated with a first node device of the first subset of the plurality of node devices;
update a value of the stored key within the second data sub-range; and
access the first node device that is associated with the first data sub-range to update the stored key within the first data sub-range.

9. A method of operating a distributed cache of storage comprising a range of stored data, the method comprising:
assigning a first subset of a plurality of node devices to a first cache level of the storage, wherein the first cache level is segmented into a plurality of first data sub-ranges of the range of stored data and each of the first subset of the plurality of node devices is associated with one of the plurality of first data sub-ranges;

assigning, by a processing device, a second subset of the plurality of node devices to a second cache level of the storage, wherein the second cache level is segmented into a plurality of second data sub-ranges of the range of stored data and each of the second subset of the plurality of node devices is associated with one of the plurality of second data sub-ranges, and wherein each of the plurality of second data sub-ranges is smaller than each of the plurality of first data sub-ranges; and
processing a read request for data within the range of stored data by accessing one of the second subset of the plurality of node devices.

10. The method of claim 9, wherein further comprising loading contents of the first data sub-ranges associated with respective ones of first subset of the plurality of node devices from one or more of the second subset of the plurality of node devices.

11. The method of claim 9, further comprising:
assigning a third subset of the plurality of node devices to a third cache level of the storage, wherein the third cache level is segmented into a plurality of third data sub-ranges of the range of stored data and each of the third subset of the plurality of node devices is associated with one of the plurality of third data sub-ranges, wherein each of the plurality of second data sub-ranges is smaller than each of the plurality of third data sub-ranges.

12. The method of claim 9, further comprising:
responsive to a failure of a failed node device of the second subset of the plurality of node devices, moving a replacement node device of the first subset of the plurality of node devices from the first subset of the plurality of node devices to the second subset of the plurality of node devices by associating, with the replacement node device, the second data sub-range that was associated with the failed node device.

13. The method of claim 9, wherein a first data sub-range associated with a first node device of the first subset of the plurality of node devices overlaps with two of the plurality of second data sub-ranges.

14. The method of claim 9, wherein the range of stored data comprises a plurality of keys, and wherein the method further comprises:
receiving a request to write a stored key of the plurality of keys, the stored key associated with the second data sub-range that is associated with a second node device of the second subset of the plurality of node devices and with a first data sub-range of the plurality of first data sub-ranges that is associated with a first node device of the first subset of the plurality of node devices;
updating a value of the stored key within the second data sub-range; and
accessing the first node device that is associated with the first data sub-range to update the stored key within the first data sub-range.

15. A non-transitory computer-readable storage medium including instructions that, when executed by a processing device, cause the processing device to:
assign a first subset of a plurality of node devices to a first cache level of storage comprising a range of stored data, wherein the first cache level is segmented into a plurality of first data sub-ranges of the range of stored data and each of the first subset of the plurality of node devices is associated with one of the plurality of first data sub-ranges;
assign, by the processing device, a second subset of the plurality of node devices to a second cache level of the storage, wherein the second cache level is segmented into a plurality of second data sub-ranges of the range of stored data and each of the second subset of the plurality of node devices is associated with one of the plurality of second data sub-ranges, and wherein each of the plurality of second data sub-ranges is smaller than each of the plurality of first data sub-ranges; and process a read request for data within the range of stored data by accessing one of the second subset of the plurality of node devices.

16. The non-transitory computer-readable storage medium of claim 15, wherein the processing device is further to load contents of the first data sub-ranges associated with respective ones of first subset of the plurality of node devices from one or more of the second subset of the plurality of node devices.

17. The non-transitory computer-readable storage medium of claim 15, wherein the processing device is further to:

assign a third subset of the plurality of node devices to a third cache level of the storage, wherein the third cache level is segmented into a plurality of third data sub-ranges of the range of stored data and each of the third subset of the plurality of node devices is associated with one of the plurality of third data sub-ranges, wherein each of the plurality of second data sub-ranges is smaller than each of the plurality of third data sub-ranges.

18. The non-transitory computer-readable storage medium of claim 15, wherein the processing device is further to:

responsive to a failure of a failed node device of the second subset of the plurality of node devices, move a replacement node device of the first subset of the plurality of node devices from the first subset of the plurality of node devices to the second subset of the plurality of node devices by associating, with the replacement node device, the second data sub-range that was associated with the failed node device.

19. The non-transitory computer-readable storage medium of claim 15, wherein a first data sub-range associated with a first node device of the first subset of the plurality of node devices overlaps with two of the plurality of second data sub-ranges.

20. The non-transitory computer-readable storage medium of claim 15, wherein the range of stored data comprises a plurality of keys, and wherein the processing device is further to:

receive a request to write a stored key of the plurality of keys, the stored key associated with the second data sub-range that is associated with a second node device of the second subset of the plurality of node devices and with a first data sub-range of the plurality of first data sub-ranges that is associated with a first node device of the first subset of the plurality of node devices;

update a value of the stored key within the second data sub-range; and access the first node device that is associated with the first data sub-range to update the stored key within the first data sub-range.

* * * * *